United States Patent [19]

DeSantis et al.

[11] Patent Number: 4,466,061
[45] Date of Patent: Aug. 14, 1984

[54] CONCURRENT PROCESSING ELEMENTS FOR USING DEPENDENCY FREE CODE

[75] Inventors: Alfred J. DeSantis, Berwyn; Joseph S. Schibinger, Phoenixville, both of Pa.

[73] Assignee: Burroughs Corporation, Detroit, Mich.

[21] Appl. No.: 386,336

[22] Filed: Jun. 8, 1982

[51] Int. Cl.[3] .......................... G06F 15/16; G06F 9/06
[52] U.S. Cl. ..................................... 364/200; 364/300
[58] Field of Search ........................ 364/200, 900, 300

[56] References Cited

U.S. PATENT DOCUMENTS

| | | | |
|---|---|---|---|
| 3,319,226 | 5/1967 | Mott et al. | 364/300 |
| 3,411,139 | 11/1968 | Lynch et al. | 364/200 |
| 3,419,849 | 12/1968 | Anderson et al. | 364/200 |
| 3,444,524 | 5/1969 | Lebrun et al. | 364/200 |
| 3,614,745 | 10/1971 | Podvin et al. | 364/900 |
| 3,913,070 | 10/1975 | Malcolm et al. | 364/200 |
| 3,983,539 | 9/1976 | Faber et al. | 364/200 |

*Primary Examiner*—Jerry Smith
*Assistant Examiner*—William G. Niessen
*Attorney, Agent, or Firm*—Mervyn L. Young; Kevin R. Peterson

[57] ABSTRACT

A data processor having a plurality of processing elements and a mechanism to receive strings of object code, form them into higher level tasks and to determine sequences of such tasks which are logically independent so that they may be separately and concurrently executed by the plurality of processing elements. The mechanism makes all memory accesses required by the various tasks and stores those tasks along with corresponding pointers or references to local memory in which the various data items have now been stored. The mechanism employs a symbol translation table in which the tasks are stored in forms of queues along with symbols representing the various references or pointers to local memory. In this manner, various data items can be assigned different symbols or symbolic names for use with different tasks thus further limiting dependency between various tasks and controlling data changes.

10 Claims, 6 Drawing Figures

CONCURRENT PROCESSING ELEMENTS FOR USING DEPENDENCY FREE CODE

RELATED U.S. APPLICATIONS

U.S. patent applications directly and indirectly related to the subject application are the following:

Ser. No. 386,339, filed June 8, 1982 by Alfred J. DeSantis et al. and entitled "Mechanism for Creating Dependency Free code for Multiple Processing Elements".

Ser. No. 386,420, filed June 8, 1982 by Alfred J. DeSantis entitled "System and Method of Renaming Data Items for Dependency Free Code".

BACKGROUND OF THE INVENTION

1. Field of the Invention

This invention relates to a mechanism for creating dependency free code and more particularly to such a mechanism for employment with a plurality of concurrent processing elements.

2. Description of the Prior Art

Most computers today are still of the von Neumann type that are driven by or execute imperative languages which are sequential in nature. Furthermore, such sequential languages contain many dependencies between the instructions so that individual instructions cannot be executed out of order. For example, consider the sequences $$C := Fn(A,B)$$

$$D := Fn + i(C,E).$$

The two functions Fn and Fn+i are said to be logically dependent since the result of function Fn is used as an input to the next function Fn+i.

A further disadvantage of sequential languages is that when sequences or loops are repeated, there is a redundancy in memory fetches and code processing which, if removed, would increase the throughput of the processor.

One manner in which the throughput of a processing system has been increased has been by employing a plurality of processors in a multiprocessing mode. However, the individual processors still must execute instructions in sequence and the only concurrency that exists is when the respective processors are executing different segments of a program or entirely different programs. Such multiprocessing systems are disclosed for example, in Mott et al., U.S. Pat. No. 3,319,226 and Anderson et al., U.S. Pat. No. 3,419,849.

Still another attempt at increasing throughput has been the employment of pipelining wherein the various subfunctions of an instruction execution are overlapped. That is to say, each instruction requires an instruction processing step, a reference processing step and an execution processing step. By overlapping these steps with successive instructions, an instruction execution can be done each clock time thereby increasing the processor's throughput.

All of these methods for increasing throughput are designed for sequential instruction execution because of the logical dependency between instructions as was indicated above. Because of the logical dependency, true concurrent processing cannot be achieved wherein the various instructions could be executed independently of each other so as to readily accommodate processing by a cluster or multiple of processing elements.

Applicative languages differ from imperative languages in that the respective statements are by nature independent of one another and thus can be implemented concurrently by a network of processing elements designed to reduce such applicative statements. An example of such applicative language processors is given in the Bolton et al. patent application U.S. Ser. No. 281,064 and the Hagenmaier et al. patent application, U.S. Ser. No. 281,065, both of which were filed July 7, 1981 and assigned to the assignee of the present application. Such applicative languages differ from imperative languages in that they are, by design, not sequential in the von Neumann sense. However, most of the program libraries that are employed today have been written in imperative languages and any update or future generations of data processing systems which are to employ those libraries must be adapted to execute imperative languages.

One manner in which throughout can be increased is to recognize segments of the object code which do not depend upon results of previous operations and to form these segments into independent sequences or queues which then can be processed concurrently by a plurality of processing elements. This of course, requires the management of operands in such a manner that an operation can be performed on an operand without destroying its original value as it exists in the memory. Different symbolic names can be assigned to reference a given data item for this purpose. In turn, the formation of such queues of code or symbols further accommodate concurrent processing by the processing units.

It is then an object of the present invention for providing an improved mechanism for creating dependency free instruction code.

It is another object of the present invention to provide dependency free instruction code for execution by multiple processing elements.

It is still another object of the present invention to provide an improved mechanism to supply dependency free instruction code to a plurality of processing elements in a concurrent manner.

It is still further object of the present invention to provide a mechanism for creating an instruction code that is free of redundant memory fetches and which code is of such nature that it does not have to be reprocessed for the processing of sequences of such code.

SUMMARY OF THE INVENTION

In order to accomplish the above-identified objects, the present invention is directed toward a cache mechanism for a data processor that is adapted to receive strings of object code, form them into higher level tasks and to determine sequences of such tasks which are logically independent so that they may be separately executed. The cache mechanism makes all memory accesses required by the various tasks and stores those tasks along with corresponding pointers or references to local memory in which the various data items have now been stored. The cache mechanism employs a symbol translation table in which the tasks are stored in forms of queues along with symbols representing the various references or pointers to local memory. In this manner, various data items can be assigned different symbols or symbolic names for use with different tasks thus further limiting dependency between various tasks and controlling data changes.

It is then a feature of the present invention to provide a cache mechanism for a cluster of processing elements which cache mechanism forms strings of sequential object code into queues of tasks each queue being logically independent of the others.

BRIEF DESCRIPTION OF THE DRAWINGS

The above and other objects, advantages and features of the present invention will become more readily apparent from a review of the following specification when taken in conjunction with the drawings wherein.

GENERAL DESCRIPTION OF THE INVENTION

Figure 1:
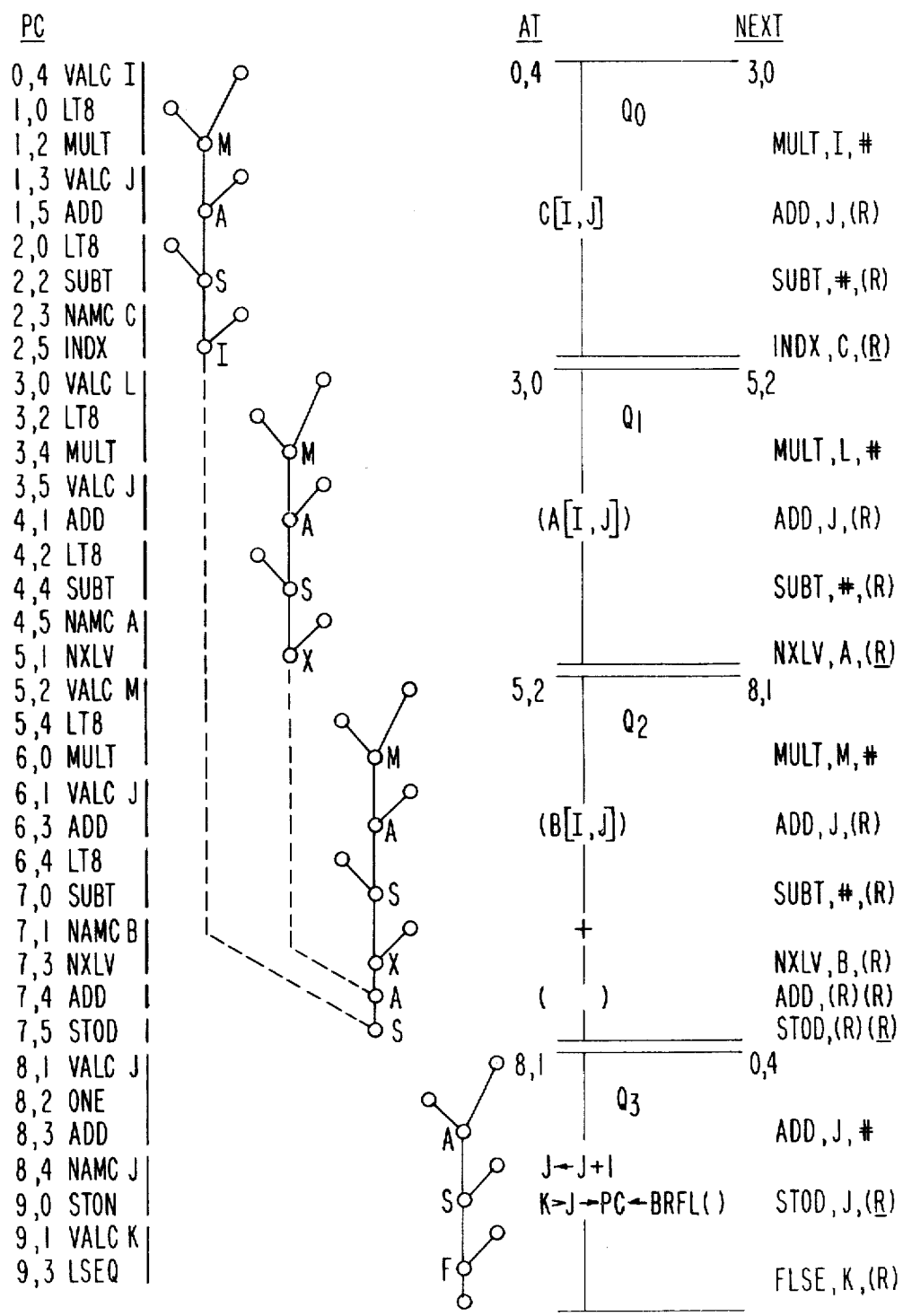
FIG. 1 is a diagram of a string of object code for which the present invention has been designed and the corresponding logically independent queues which are formed from that object code.

In order to achieve the above objects, advantages and features, the present invention has three different aspects: improved code processing, reference processing and parallel execution by multiple processing elements. In code processing, the present invention preprocesses instruction strings by concatenation first, looking at relationships between successive concatenated instructions and linking those instructions together to form a queue of dependent instructions. The mechanism that is employed to determine whether concatenated instructions are to be linked together is the dependency on one concatenated instruction providing an input to the following concatenated instruction. Once an independency is located, a queue is formed. Once the queue is formed, the mechanism under the present invention benefits by processing that entire queue in one step. What would take several cycles to normally reprocess the concatenated instructions now is done in one cycle and the queues need not be recreated for the execution of successive sequences.

Furthermore, during the preprocessing of the code, operand references which had been previously referenced and are local to the processing elements can be recognized. This is accomplished by receiving each reference and scanning a translation table to see if that item is resident in the processor's local memory. If the reference is not resident in the processor's local memory, the present invention assigns a symbol to that reference and the respective symbols corresponding to a given queue are attached thereto for subsequent transmission to one of the processing elements. Once the corresponding queues have been formed, they can be executed concurrently by a plurality of processing elements.

There has been an increasing tendency in the design of present day data processing systems to employ stack oriented processors wherein push-down stacks, or first-in last-out stacks, are provided to accommodate nested processes and recursive procedures as employed by particular higher level program languages. When such stack oriented processors are provided, the master control program, and other routines which form a part of the operating system, can also be written in a particular higher level language which is recursive in nature such as ALGOL 60. A particular processor module of this type is disclosed in the Barton et al. U.S. Pat. Nos. 3,461,434; 3,546,677; and 3,548,384.

The function of the stack mechanism, a first-in last-out mechanism, is to handle instructions and associated parameters in a manner which reflects the nested structure of the particular higher level languages. Such stacks conceptually reside in main memory and the stack mechanism of the processor is adapted to contain references to the top data item in the stack. In this manner, a number of various stacks of data items may reside in memory with the processor accessing them according to an address to the top of stack register which exists within the processor and various stacks can be accessed at different times by changing the contents of that register.

If the processor is not provided with such a stack mechanism, it may nevertheless execute recursive type languages by addressing its general purpose registers as though they were a hardwired stack mechanism.

While the preferred embodiment of the present invention is directed toward such a stack oriented processor for executing programs written in a high level recursive language, the concepts of the present invention can be employed in other forms of processor design and which execute forms of higher level language programs other than recursive ones.

Once the program has been written in this higher level language, it is then compiled by the processor's compiler into strings of object code or machine language code, the form of which is particularly designed for, as well as controlled by, the particular processor design. As was indicated above, most processors designed today are still of the von Neumann type which are sequential in nature and which contain many logical dependencies.

In order to generally demonstrate how the present invention provides the dependency free code in the form of "decompiled" higher level language codes, reference is now made to FIG. 1. The left hand column of that Figure represents a string of machine language code for calculation of C [I,J]:=A [I,J]+B [I,J]. Since this calculation is for a number of addresses, the string of machine language code illustrated on the left side of FIG. 1 will be executed in a series of sequences or series of loops.

This string of code can be divided into four groups or subsets of code each of which groups is largely logically independent of the others as indicated by the diagram in the central portion of FIG. 1. In general, the mechanism of the present invention determines the end of the logically dependent string when the next operation is independent of the previous operation, or a store operation.

In the present invention, the mechanism executes value calls or memory fetches and forms queues of operators and data items (or local addresses to data items) as indicated in the right column of FIG. 1. These operators and their data items are then concatenated together and can be transmitted to a processing element in a manner that will be further described below. Such concatenated instructions will be referred to hereinafter as tasks.

In the example of FIG. 1, the four separate queues are logically independent groups of dependent concatenated instructions and can be executed concurrently by separate processing elements as will be further described below. Since the string of code in the left hand column of FIG. 1 is to be executed in a sequence of loops, the newly created queues in the right hand column of FIG. 1 need not be recreated. All that is required for each successive loop is that news values and array items be fetched from memory. Also, new pointer values must be assigned to variables that are stored.

DETAILED DESCRIPTION OF THE INVENTION

Figure 2:
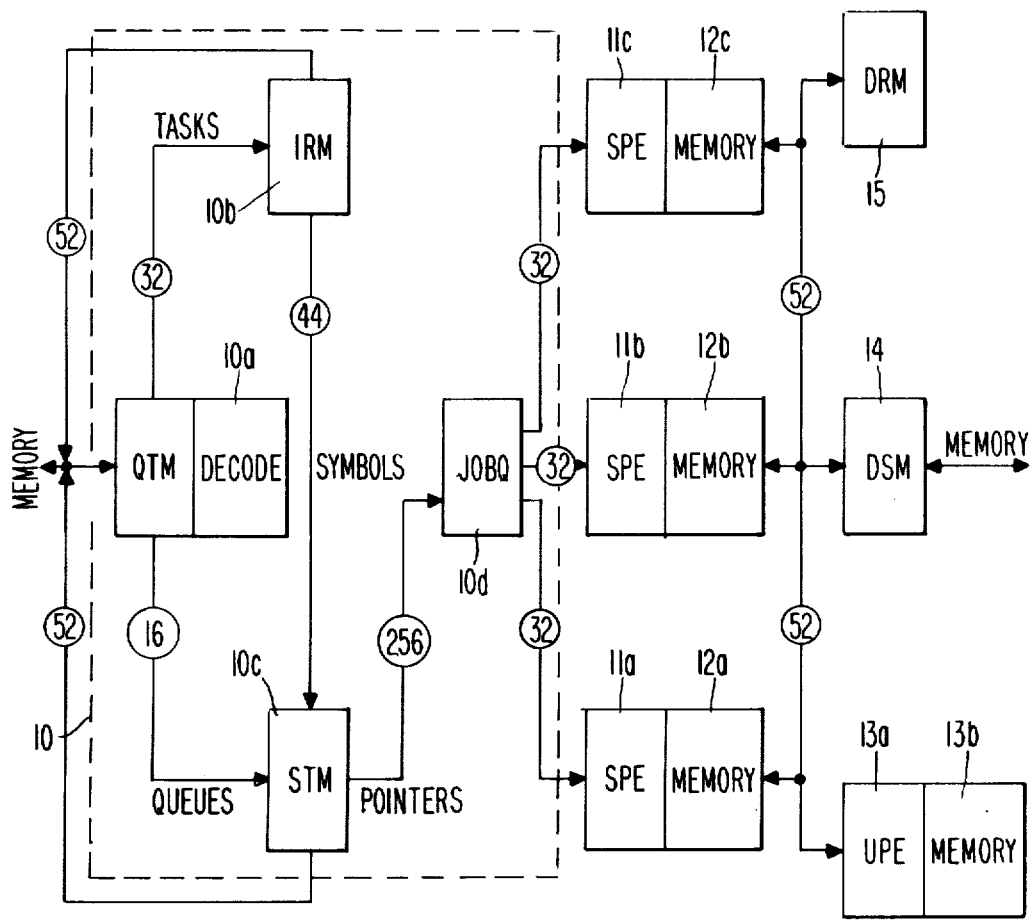
FIG. 2 is a schematic diagram of a system employing the present invention.

A processor system employing the present invention is illustrated in FIG. 2 wherein the cache mechanism 10 is the mechanism for supplying the respective queues of operators and data references to a plurality of small processing elements 11a, b and c as well as unique processing element 13a each of which is provided with its own local memory 12a, b and c as well as local memory 13b respectively. Cache mechanism 10 communicates directly with a main memory (not shown) and the respective processing elements also communicate with main memory by way of direct storage module 14.

Mechanism 10 is formed of four units which include queuing task module 10a, instruction reference module 10b, symbol translation module 10c and job queue 10d. The functions of these respective units will now generally be described. The respective strings of object code or machine language code are received from memory by queuing task module 10a which is a buffer or cache memory that receives the respective instructions serially and assembles them into queues of tasks the lengths of which are dependent upon logical dependencies between successive concatenated instructions. Queuing task module 10a contains sufficient decoding circuitry to determine when a concatenated group of instructions does not require a result from a previous calculation. When such a queue of concatenated tasks has been assembled, its' operand references are transferred to instruction reference module 10b which performs any memory fetches required by respective instructions and assigns symbols. The queuing task module 10a also assigns a queue number to symbol translator module 10c. As further described below in regard to the string of code received by Queuing task module 10a, this module determines the end of a logically dependent string of code when an operator is found that calls for a store in memory as distinct from a fetch from the top of the stack (or local buffer registers). The decoding circuitry referred to above to implement these tests may be a priority encoder such as described in "The TTL Data Book for Design Engineers", Texas Instruments, 1976, pp. 7-151 to 7-152.

Instruction reference module 10b is an associative memory which determines whether an absolute memory address is logically held and if not, it makes that memory access by sending that address to main memory and stores the address and assigns a symbol to it. This associative memory then transfers the symbol along with the corresponding task to symbol translation module 10c. An associative memory or content addressable memory which forms Instruction reference module 10b may be of the type described in T. J. Kuck, "The Structure of Computers and Computations", vol. 1, pp. 419 and 420, Wiley, 1978. Symbol translation module 10c assigns a pointer (local memory address) to the symbol and transmits that pointer to main memory so that main memory can store the data item in local memory. During the first run through of the string of object code, queues for successive executions are being formed in the symbol translation module 10c. While those queues are being formed, the respective tasks and the pointers are transferred to job queue 10d.

Symbol translation module 10c is a table look-up memory having various queue locations which can be referenced by queuing task module 10a. These locations contain a list of concatenated instructions and symbols of items held in the processing elements' local memories. As each queue is read, the symbols for the queue are used as read addresses to a look-up table containing pointers to the actual location of the items referred to by the symbol, as will be more thoroughly described below. At the end of the first processing of the object code string of FIG. 1, job queue 10d now contains the respectively created queues which can be passed serially by tasks and pointers to respective processing elements 11a, 11b, and 11c for concurrent execution. In the meantime, respective data items required for execution have been fetched from main memory and stored at the appropriate locations in local memories 12a, and 12b and 12c, which locations are accessed by the pointers in job queue 10d.

On the completion of the execution or first loop of the object code, successive loops can now be executed by supplying the previously created queues from symbol translation module 10c to job queue 10d until such time as all of the task processing has been completed.

Figure 3:
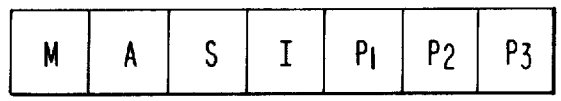
FIG. 3 is a diagram of the format of a queue as formed by the present invention.

The format of a queue as it resides in job queue 10d of FIG. 2 is illustrated in FIG. 3. The respective fields reading from left to right are a multiply instruction, add instruction, subtract instruction, and the index instruction followed by the pointers for the I, J and C fields. These correspond to the first queue ($Q_0$) in FIG. 1, wherein an 8 bit literal has become a part of the respective multiply and add instructions.

The queues thus formed not only retain the instructions for future execution but also identify the stack environment as well as its address and location of the next queue to be executed. No other processing steps are necessary for code processing other than the issuing of queues one per step to an available processing element.

Figure 4:
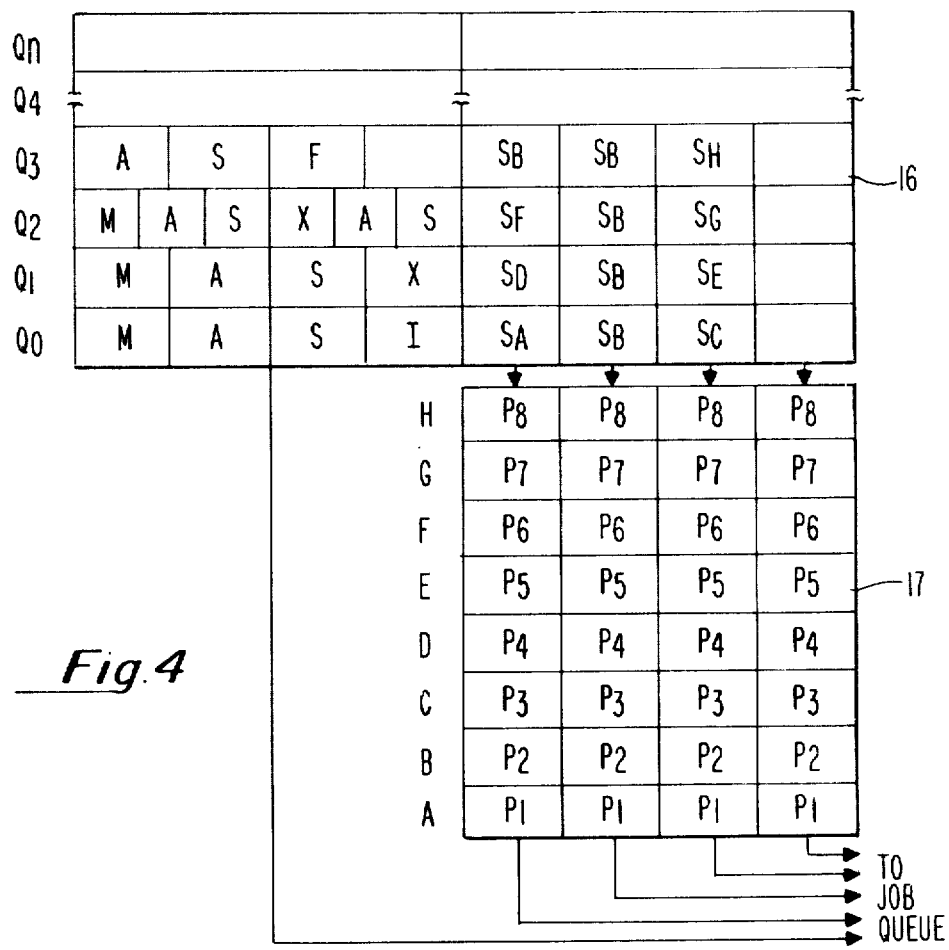
FIG. 4 is a schematic diagram of a symbol translation table module as employed in the present invention.

Symbol translation module 10c of FIG. 2 is illustrated in greater detail in FIG. 4. As shown therein, this module is a table look-up mechanism where the columns of the queue symbolic table 16 represent locations for the concatenated tasks as well as the symbolic names assigned by the instruction reference module 10b of FIG. 2 and the corresponding rows represent the respective queue numbers as assigned by queuing task module 10a of FIG. 2. As was indicated above, the queues thus formed in the symbol translation module are now ready to access pointers in pointer table 17 for transfer to job queue 10d of FIG. 2 for each successive loop of the calculations to be made. Job queue 10d is a first in-first out set of registers.

It will be noted that for FIG. 4 that the various symbols are indirect local memory references, and thus the items stored therein, can be given different pointers. This provides two advantages. First, a given data item may be stored in more than one location in local memory by renaming or assigning different pointers to represent it and the second advantage is that a given variable can be stored in one location and left there without changing its pointer while the results of an operation made on that variable can be stored at another location having the same symbolic name but a different pointer.

Figure 5:
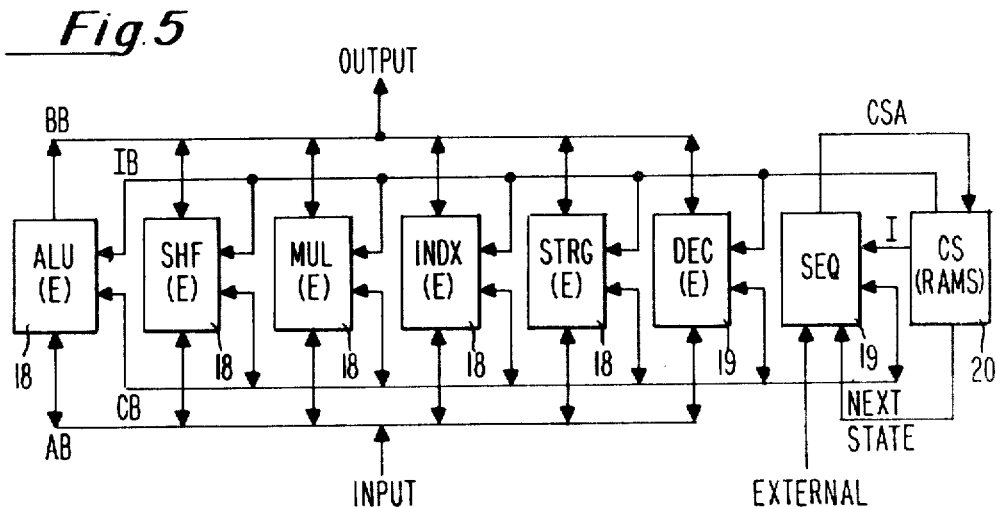
FIG. 5 is a schematic diagram of a processing element as employed in the present invention.

The respective processing elements of FIG. 2 are illustrated in FIG. 5. In essence, they are formed of a plurality of microprogrammed microprocessors which are commercially available such as the Intel 8086 or they may be customized microprogrammed processors such as disclosed in the Faber et al., U.S. Pat. No. 3,983,539. Since the respective processors are provided to execute different functions, they can also be special purpose microprocessors containing only that amount of logic circuitry required to perform their respective functions. The respective circuits 18 are the arithmetic logic unit, shift unit, multiply unit, indexing unit, string processor and decode unit. In addition, sequencing unit 19 receives instructions from the job queue 10d of FIG. 2 to access microinstructions stored in control store 20. Microinstructions from the control store are supplied to the respective units over instruction bus IB while any condition signals generated by the units are transmitted over condition bus CB. Data from corresponding local memory is received on A bus AB and the executed results are supplied to B bus BB.

Referring back to FIG. 1, a more detailed description will now be provided of the various instructions in the code string being received by queueing task module 10a of FIG. 2 and the higher level instructions or tasks that are formed by that module. As indicated in the left hand column thereof, the first three instructions of the code string are a value call or memory fetch of data item I, an 8 bit value, and a multiply instruction. These are concatenated to the task: multiply I by the literal value as indicated by the first task at the right hand column of FIG. 1. The process continues for the add task and the subtract task. The name call instruction is an instruction that puts a data item address on top of the stack and the index instruction results in the insertion of a pointer in a descriptor which is in memory. Thus, the first queue $Q_0$ has been formed.

Formation of $Q_1$ is similar except that after the name call instruction, the instruction NXLV is executed which causes an index operation and also the fetch of data. Thus, the second queue $Q_1$ has been formed. In the formation of the third queue $Q_2$ there is an addition instruction which results in the adding of the values thus calculated for A and B followed by a destructive store in memory (STOD) which destroys the value at the top of the stack.

It is to be noted from the central diagram of FIG. 1, that the execution of the last two tasks or concatenated instructions of $Q_2$ require the results of the calculations $Q_0$ and $Q_1$ which values are stored in local memory. The locations and their respective local memories are provided with an index flag to indicate whether or not the reference has in fact been stored there. In this manner, when the processing elements are operating in the concurrent manner, it is possible that the routine of $Q_2$ will reach the second or final add task before the required values have been calculated and stored in local memory. The corresponding processing element will detect that these values are not yet available and will continue to access those locations until such time as the values do become available.

The fourth queue or $Q_3$ results in fetching of the value J and adding 1 to it, inserting its address at the top of the stack followed by a non-destructive store in memory while leaving that value in the top of the stack. The last four instructions result in fetching a value K from memory, comparing it with the value J (LSEQ) and if the value K is greater than the value J, the next instruction, branch on false, causes a reloading of the program counter and the routine is repeated. Otherwise, the last instruction in the code string is an unconditional branch which causes an end to the routine.

Figure 6:
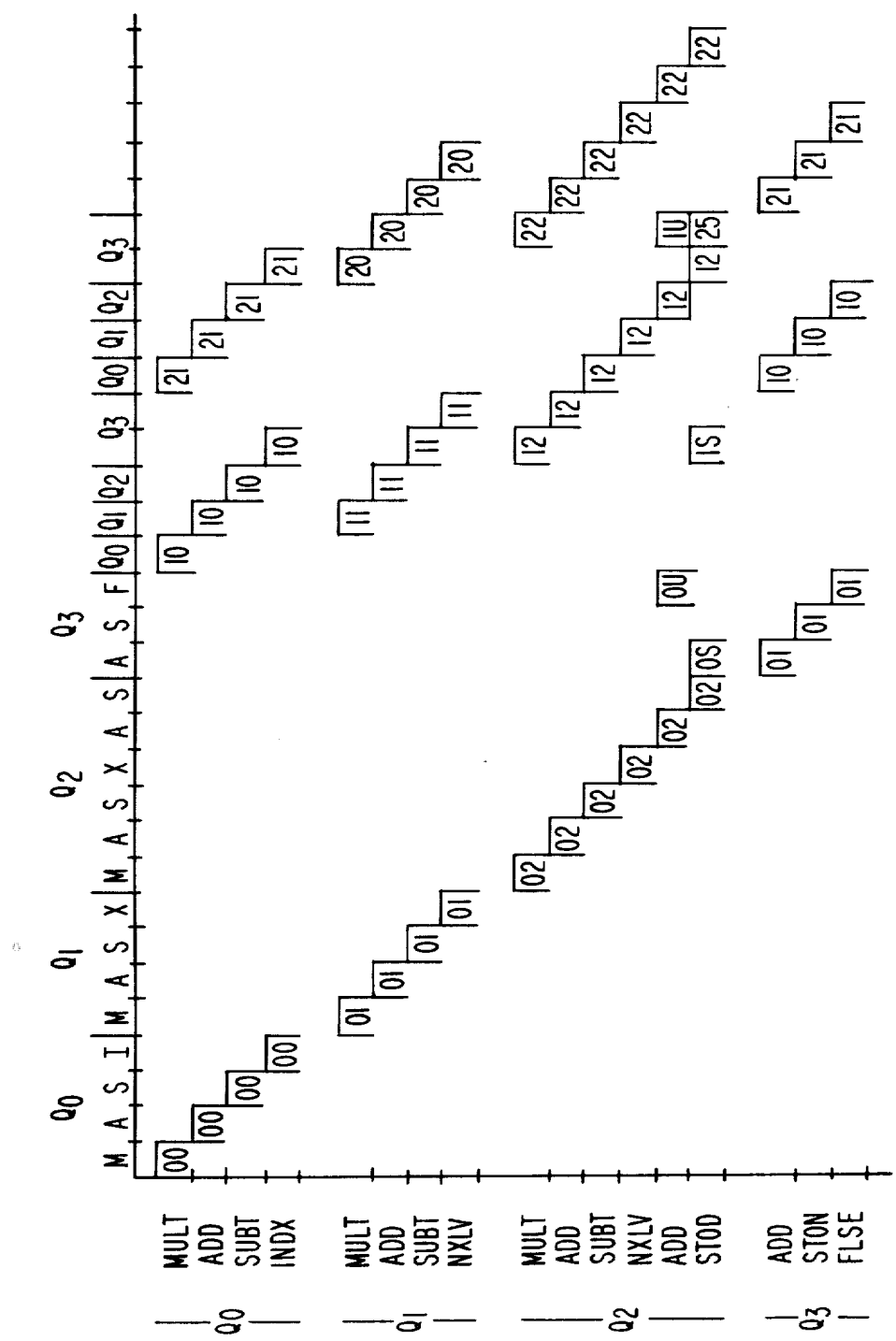
FIG. 6 is a timing diagram illustrating the present invention.

FIG. 6 is a timing chart of the queue execution times for the respective queues wherein each clock time for a particular task is represented by two numbers. The first number represents the particular loop or sequence being executed and the second number represents the particular processing element performing the execution. It is noted therein that the first pass of the code string which results in the formation of the queues as well as the execution of the tasks requires approximately 17 clock times while subsequent loops require only 5 clock times for execution due to the concurrency with which the respective dependency free queues are executed since the tasks do not have to be reprocessed fully in the QTM and the IRM.

In general, the queueing task module performs the steps of concatenation of the instructions to tasks, the queueing of those tasks, queue execution, tag prediction and branch correction. The instruction reference module performs the function of renaming, symbol management and replacement. The symbol translation module provides parallel accessing, pointer allocation and stack allocation. Small processing elements are provided for frequent task execution while the unique processing element is employed for non-frequent task execution and also the function portion of strings. The direct reference module 15 of FIG. 2 is provided for the evaluation of non-stack references.

EPILOGUE

A mechanism for a data processor has been described which receives the compiled object code, forms sequences of that code into higher level tasks and forms a queue of such tasks which is logically independent of other queues in the sense that it does not require a result from a previous execution of an object code string. In this manner, a sequence of such queues can be supplied to independent processing elements for concurrent execution.

A symbol translation table is provided by which data items are referenced symbols and that symbol is assigned an arbitrary pointer to local memory which can be changed so that a data item may reside in more than one memory location and also so that the data item may be left in memory while the results of an operation on that item can be stored in another location.

While but one embodiment of the present invention has been disclosed, it will be apparent to those skilled in the art that variations and modifications may be made therein without departing from the spirit and scope of the invention as claimed.

What is claimed is:

1. In a data processing system for executing imperative code including operators and memory addresses, the combination comprising:
   means for forming strings of logically dependent operators into logically independent queues;
   storage means for storing said logically independent queues; and
   a plurality of processing means coupled to said storage means for individually receiving different ones of said queues for concurrent execution.

2. The combination according to claim 1 wherein said forming means includes means for receiving said imperative code in sequential form, determining when an operator does not require a result of a previous operation thus indicating a logical independency and forming strings of said logically dependent operators into logically independent queues.

3. The combination according to claim 2 wherein said data processing system includes a main memory, said combination further comprising:

main memory addressing means to receive said memory addresses and fetch data from said main memory.

4. The combination according to claim 3 wherein each of said processing means includes a local storage, the combination further comprising:

local storage addressing means coupled to said main memory to transmit local memory addresses to said main memory so that said main memory can transmit said fetched data to said local memory.

5. The combination according to claim 4 further including:

queue table means coupled to said forming means and said local storage addressing means to attach said local memory address to a corresponding string of operators making up a particular logically independent queue.

6. In a data processing system for receiving and executing sequential code including operators and memory addresses, said system including a plurality of processing means, the method comprising:

receiving said sequential code;

determining when an operator does not require the result of a previous operation indicating a logical independency;

forming strings of logically independent and subsequent logically dependent operators into logically independent queues; and transmitting different ones of said queues to different individual processing means for concurrent execution.

7. The method according to claim 6 wherein said data processing system includes a main memory, said method further comprising:

receiving a main memory address and fetching data from said main memory.

8. The method according to claim 7 wherein each of said processing means includes a local storage, the method further comprising:

transmitting local memory addresses to said main memory so that said main memory can transmit said fetched data to said local memories.

9. The method according to claim 8 further including:

attaching said local memory addresses to a corresponding string of operators making up a particular logically independent queue.

10. The method according to claim 9 wherein said data processing system includes a job queue, the method further including:

transmitting said independent queues of operators and corresponding local memory addresses to said job queue for subsequent distribution to said individual processing means.

* * * * *